United States Patent [19]

Ooue et al.

[11] 3,865,478

[45] Feb. 11, 1975

[54] MICROFILM PROJECTING SYSTEM

[75] Inventors: Shingo Ooue; Hiroyuki Ueda; Masakazu Hashiue; Makoto Murakoshi; Toshitaka Suwama; Masaru Noguchi, all of Saitama, Japan

[73] Assignee: Fuji Photo Film Co., Ltd., Kanagawa, Japan

[22] Filed: Nov. 4, 1971

[21] Appl. No.: 195,761

[30] Foreign Application Priority Data

Nov. 4, 1970 Japan .............................. 45-96479

[52] U.S. Cl. .............................................. 353/26

[51] Int. Cl. ........................................ G03b 23/12

[58] Field of Search .... 340/172.5, 173 LM; 353/25, 353/26, 27

[56] References Cited

UNITED STATES PATENTS

| | | | |
|---|---|---|---|
| 3,242,470 | 3/1966 | Hagelbarger et al. | 340/172.5 |
| 3,325,786 | 6/1967 | Shashoua et al. | 340/172.5 |
| 3,332,071 | 7/1967 | Goldman et al. | 340/172.5 |
| 3,585,597 | 6/1971 | Holmerud | 340/172.5 |
| 3,612,676 | 10/1971 | Ooba et al. | 353/27 |
| 3,662,348 | 5/1972 | Weiss | 340/172.5 |
| 3,700,320 | 10/1972 | Brewer et al. | 353/26 |

*Primary Examiner*—Gareth D. Shaw

*Attorney, Agent, or Firm*—Sughrue, Rothwell, Mion, Zinn & MacPeak

[57] ABSTRACT

Image information is recorded in plural frames of a microfilm. A key device having keys representing letters or numerals inputs a keyword repesenting the information to be retrieved. A memory stores information representing the correspondence-relationship between the keyword representing image information and the frame number of the frame in which the image information is recorded. A comparator circuit compares the keyword with the information in the memory so as to output the frame number of the desired frame. The output signal of frame number drives a shifting device so as to project the desired frame on a screen. In addition, an optical disk memory is used as the memory by reason of its adaptability for a microfilm projecting system.

3 Claims, 4 Drawing Figures

MICROFILM PROJECTING SYSTEM

BACKGROUND OF THE INVENTION

The present invention relates to a system for searching out desired information from among a quantity of information recorded on microfilm having plural frames therein and projecting the desired information. Particularly, the present invention relates to improvements in such an automatic searching system.

With the progress of information-systemization of society, it has been an important problem how to handle floods of information offered from many sources. Accordingly, there is required an information searching system, which is capable of storing a great amount of information therein and quickly outputting only the necessary information therefrom.

It is said that more than 80 percent of the information required by a human being is visual, that is, image information. For storing such important image information, a microfilm system is much more suitable, from the viewpoint of information capacity, than magnetic recording systems.

Heretofore, in conventional microfilm systems, in order to search out desired information, it has been required to know what image is recorded in what part of a microfilm by using an index table, or to know the location of the image by using a computer which stores indexes. The conventional searching method, therefore, has inevitably needed two steps of operation which comprise knowing the location of a desired image and searching it out by using its frame number for projection on a screen.

Such a method is so inefficient as to be unsuitable for searching over a great amount of information and quick-outputting desired information therefrom. Accordingly, it has been unable to respond to the demands of the present society wherein there is a flood of information.

SUMMARY OF THE INVENTION

An object of the present invention is to provide a fully automatic microfilm searching and projecting system, wherein an inner searching means finds out the location of desired information (e.g., word, number, code, etc.) only by the operation of pushing a key (e.g., a key designated with a letter or a numeral), and sends the command to a film shifting means, and a projecting means projects the desired information on a screen.

The microfilm searching and projecting system of the present invention comprises a storing means for storing a great amount of information, an information processing means for translating an input signal into the address of the desired image information, and projecting means for projecting the desired image information onto a suitable screen.

A microfilm having plural frames therein may be used as the storing means. The information processing means comprises an input key device, a register, a memory and a comparator circuit. A letter- or numeralkey device may be used as the input key device for inputting desired information. The register temporarily stores the information from the input key device, for which various kinds of known circuits may be utilized. In the memory, there is stored the correspondence-relationship between information recorded in a microfilm and the frame number of the frame in which the information is recorded. The memory may be a magnetic tape, magnetic core, magnetic drum, or optical memory or the like. The comparator circuit compares the information in the register with the information in the memory so as to find which frame of the microfilm stores the desired information and it may be made of various kinds of known logic circuits. The projecting means may be a conventional optical system for projection generally used in a microfilm reader.

Thus, in accordance with the present invention, there may be no necessity of taking time to read an index table, or operating a computer, whereas the desired information may be projected on a screen only by the operation of inputting the keyword corresponding to the desired information. Accordingly, the microfilm searching and projecting system of the present invention will be widely used for searching over, for example, dictionaries (language dictionary, encyclopedia), various kinds of guidance information (telephone number guidance, companies guidance, time table, freight table, tour guidance), patent information or the like.

The microfilm searching and projecting system according to the present invention, both as to its construction and its mode of operation, together with its advantages, will be best understood upon perusal of the following detailed description of the specific embodiment of the present invention and the advantages thereof, with reference to the accompanying drawings.

DETAILED DESCRIPTION OF THE INVENTION

Figures 1, 2, 3, 4:
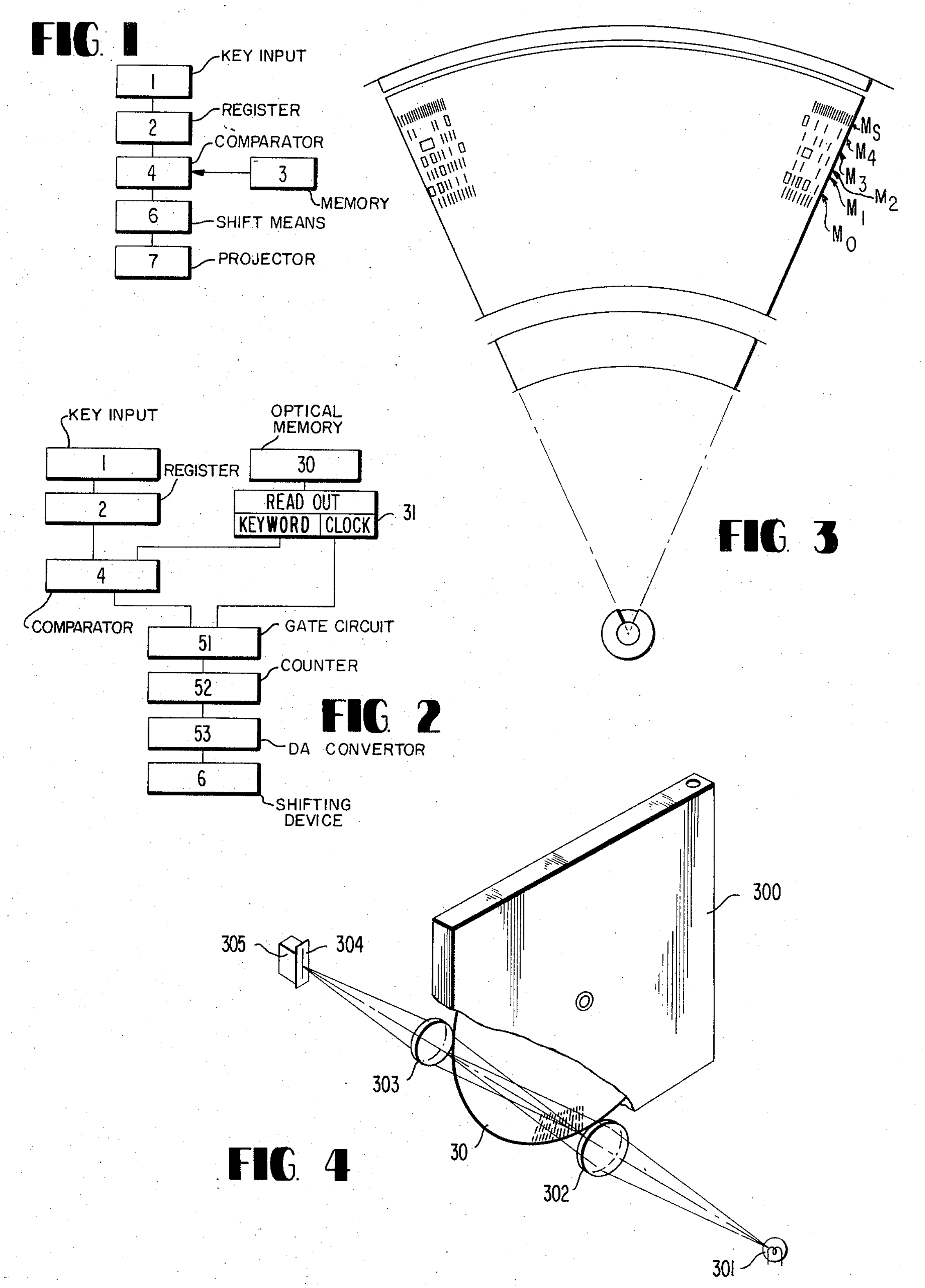
FIG. 1 is a block diagram illustrating the whole construction of the microfilm projecting system according to the present invention.
FIG. 2 is a block diagram illustrating the whole construction of a specific embodiment of the system of the present invention.
FIG. 3 is a top plan view of the optical disk memory used in the embodiment system of FIG. 2.
FIG. 4 is a schematic, partially broken away, perspective view of the read-out device for the disk memory of FIG. 3.

Referring to FIG. 1, desired information, i.e., a desired keyword, is inputted into a register 2 from a key device 1. A memory 3 stores frame numbers and the keywords associated with the frame numbers. Keywords in the memory 3 are compared with the keywords in the register 2 in a comparator circuit 4 so as to search out the frame number relating to the desired keyword and to shift a microfilm such that the projecting optical system of a projector 7 corresponds to the location of the frame affixed with the searched-out frame number.

A microfilm shifting device 6 may be made to shift a microfilm relating to a fixed optical system, or to shift an optical system relating to a fixed microfilm.

The designation of frame numbers may be one dimensional in the case that the microfilm is a roll film, whereas it will be required to be two dimensional, i.e., X-Y co-ordinates, in the case of a sheet film, i.e., a microfiche, so that a means for translating frame numbers into X-Y coordinates will be provided.

In order to give a better understanding of the present invention, a specific embodiment thereof will now be explained.

As shown in FIG. 2 and in more detail in FIG. 3, an optical disk memory 30 is used as the memory 3. In the optical disk memory 30, 1 and 0 signals (white and black in black-ground) of 5 bits $M_0$ to $M_4$ and clock signals *Ms* are stored along a line in a radial direction on a film disk by photographical recording. Representing an alphabetical letter with 5 bits, several letters are given for the keyword corresponding to one frame, i.e., several radial lines arranged in a peripheral direction relate to one frame (6 letters, i.e., 6 lines are given relating to one frame in the example in FIG. 3). Each of the clock signals is arranged to correspond to each of the lines, and by counting the clock signals the frame number may be obtained. Looking to FIG. 3, since 6 clock pulses correspond to one frame, the frame number may be obtained by dividing the count number of the clock signals by 6. In this case, of course, it is necessary that a logic circuit be so set up as to start counting from a first line. The letters represented by 5 bits may be defined, for example, as the following: A:00001, B:00010, C:00011, D:00100, . . . , where 0 and 1 may be represented to be black and white in black-ground, respectively.

As shown in FIG. 4, the optical disk memory 30 is rotatably mounted into a magazine 300. The optical readout system, which may be constructed with the sequential arrangement of a light source 301, a condenser lens 302, the disk 30, a projecting lens 303, a slit 304 and a silicon photocell 305, reads out the recorded signals (i.e., keywords) in the disk memory 30 in accordance with the rotation of the disk. The output signals therefrom are compared with the keywords from the register 2 in the comparator circuit 4 made of known logic circuits. When there is the coincidence therebetween, or when there is the inversion of the magnituderelation therebetween, representing a keyword by a numeral and making the comparison therebetween in respect of the magnitudes of the numerals (in this case, an amplitude discriminator circuit will be used), the count number of the clock signals indicates the desired frame number and the frame number is transmitted, as a command, to the shifting device 6. For this purpose, a gate circuit 51, a counter 52, DA-convertor 53 and the X-Y shifting device 6 (in the case of X-Y co-ordinate) may be arranged as shown in FIG. 2. The clock pulses read from disc 30 and beginning at the start of revolution are read into counter 52 via gate 51 until the latter is closed by a match signal from comparator circuit 4.

In the practice, as to the relative shifting between the film and the optical system, it will be better that the optical system by fixed and the film is shifted, because it will be easily manufactured. It will be possible to use as the film a roll film or a sheet film (i.e., a microfiche). Further, a micro-hologram will be able to be used instead of the microfilm (a microhologram consists of the arrangement, in a roll film or in a sheet film, of plural small holograms in which images are recorded). For shifting the film, a known take-up device may be used in the case of a roll film, and, in the case of a microfiche, an X-direction driving means may be set up on a Y-direction driving means and both driving means are driven so as to shift the fiche to the desired position by the voltage assigned to each of them in accordance with the frame number. For this driving means, a two-phase motor device may be used, wherein the control circuit thereof enables the feedback to control the position of a contact member, to which the film holder is fixed, in a potentiometer by amplification of unbalanced current. It will also be possible to shift the film with a pulse motor, if digital signals are derived from the counter 52 with translating the co-ordinate signals into pulse signals.

Though an optical disk memory is used as a memory in the above described embodiment, it is possible for other memories, such as magnetic tape, magnetic disk or magnetic drum to be used. However, an optical disk memory has advantage over other memories in the microfilm projecting system of the present invention. The advantages are listed below:

1. Since the optical disk memory has information photographically recorded thereon, duplication of the memory is easily carried out. Ease of duplication is a distinct advantage since many copies of the same information are likely to be needed.

2. The optical disk memory provides stable storage of information therein and has a semi-permanent life about as long as the microfilm.

3. The optical disk memory is suitable for a miniature memory.

4. It is easier to market and use the microfilm and memory as a matched pair if the memory is an optical disc. This is because other types of memories cannot as easily be removed from the machines with which they operate.

5. Though a magnetic tape memory needs a magnetic head to read out information therefrom, the optical disk memory has no contacting member thereto on the read-out, so that a read-out device therefor is relatively trouble free.

As described above, according to the system of the present invention, it is possible that the desired information is projected on a screen only by pushing a key, without reading the index table wherein information and frame numbers are compared. Thus, anyone may search out the desired information with perfect ease.

Besides, using the optical disk memory, a set of the microfilm and the disk may be handled, or set for sale, as an Information Searching Set, so that it will be carried out to popularize such a system in the fields of information processing and micro publication.

What is claimed is:

1. A microfilm projecting system of the type having imaging means for projecting an image of selected frames of a microfilm loaded into said system, said system comprising:

a. a register for temporarily storing information therein, b. a key input means for entering into said register information representing a keyword designating the information content of a frame of said microfilm, c. an optical disc memory having indicia thereon representing frame addresses and frame keywords designating respectively the address of a frame of said microfilm and the information on a frame of said microfilm, said indicia being positioned on said disc so that a keyword and frame address applicable to a single frame appear on the same radial part of said disc but at different distances from said disc center on said radial part, said indicia designating frame address consisting of optically readable clock signalling marks positioned circumferentially on said disc, the number of said clock signalling marks from a given position on the circumference of said disc to any other position on the circumference on said disc being the said designation of said frame address of the microfilm frame whose information is designated by the keyword at said other position in the circumference on said disc, d. optical means for reading out sequentially the indicia on said optical disc memory including said indicia representing keywords and said clock signalling marks and for converting said read-out indicia into signals representing read-out keywords and clock signals, respectively, e. circuit means connected to said register and to said read-out means for counting the said clock signals until said signals representing read-out keywords match the keyword information in said register, said accumulated count representing a frame address, and f. a shifting device means responsive to said frame address accumulated by said circuit means for relatively shifting said microfilm and said imaging means to result in the projection of a frame of said microfilm corresponding to said last mentioned frame number.

2. The microfilm projecting system as set forth in claim 1 wherein said indicia representing keywords is arranged on said disc such that said indicia along each radial line represents a single letter, the adjacent letters comprising a keyword being stored along successive radial lines, the relative position of the radial lines associated with a keyword with respect to all the lines of coded indicia on the memory defining the corresponding frame address.

3. The microfilm projecting system as set forth in claim 2 wherein said microfilm is in the form of a microfiche, said shifting device comprising an X-Y shifting means including an X-direction driving means and a Y-direction driving means, said X and Y direction being orthogonal.

* * * * *